United States Patent
Vigouroux et al.

Patent Number: 5,251,003
Date of Patent: Oct. 5, 1993

[54] DEVICE FOR MONITORING OF ALIGNMENT OF TWO OPTICAL PATHS AND LASER DESIGNATION SYSTEM EQUIPPED WITH SUCH A MONITORING DEVICE

[75] Inventors: Jean-Francois Vigouroux, Paris; Jean-Marc Rouchon, Orsay; Jean-Louis Ricci, Paris; Marc Wally, Montigny le Bretonneux, all of France

[73] Assignee: Thomson-CSF, Puteaux, France

[21] Appl. No.: 863,310

[22] PCT Filed: Oct. 25, 1991

[86] PCT No.: PCT/FR91/00845
§ 371 Date: Jul. 13, 1992
§ 102(e) Date: Jul. 13, 1992

[87] PCT Pub. No.: WO92/08944
PCT Pub. Date: May 29, 1992

[30] Foreign Application Priority Data
Nov. 16, 1990 [FR] France .................. 90 14285

[51] Int. Cl.⁵ .............. G01B 11/26; G01C 1/00; G01J 1/00
[52] U.S. Cl. .................. 356/152; 250/341; 356/138
[58] Field of Search .............. 356/138, 140, 141, 152; 250/341

[56] References Cited

U.S. PATENT DOCUMENTS

| | | |
|---|---|---|
| 3,978,458 | 8/1976 | Vergnolle et al. |
| 4,325,083 | 4/1982 | Rouchon et al. |
| 4,422,758 | 12/1983 | Godfrey et al. ............ 356/152 |
| 4,649,274 | 3/1987 | Hartmann ............ 250/341 |
| 5,200,622 | 4/1993 | Rouchon et al. |

FOREIGN PATENT DOCUMENTS 2165957 4/1986 United Kingdom.

Primary Examiner—Stephen C. Buczinski
Attorney, Agent, or Firm—Oblon, Spivak, McClelland, Maier & Neustadt

[57] ABSTRACT

The invention relates to a device for monitoring of alignment of two optical paths, a laser aiming path and an infrared imaging path.

The monitoring device according to the invention is composed of two half-housings, and of a cassette containing a polyimide film (11) and means of advancing of this film.

The housing acts as a cube corner in order to re-emit, from an incident laser beam (FL) to an infrared beam (FI) which is collimated and strictly parallel or coincident with the incident beam (FL) by heating of a an optical system for focusing/collimation (15 to 21). The position of the hot point visually displayed on the infrared detector makes it possible to measure the alignment offset of the two paths.

Application to systems for target designation by laser guidance with two separate or partially coincident optical paths.

11 Claims, 3 Drawing Sheets

POLYIMIDE FILM

DEVICE FOR MONITORING OF ALIGNMENT OF TWO OPTICAL PATHS AND LASER DESIGNATION SYSTEM EQUIPPED WITH SUCH A MONITORING DEVICE

BACKGROUND OF THE INVENTION

1. Field of the Invention

The invention relates to the field of objective designation by laser guidance for weapons systems, and the subject, more particularly, is a device for monitoring of the alignment of two optical paths of a laser designation system or "pod" (this term signifying a nacelle in English) for target designation by laser guidance, namely an infrared optical path (of wavelengths from 8 to 12 micrometers) and a laser path (1 to 2 micrometers), and a laser designation system equipped with such a monitoring device.

2. Discussion of the Background

In severe environmental conditions, especially in terms of temperature and of vibration, target designation by laser guidance of the projectile is advantageously carried out by virtue of a "pod" arranged for external carriage on an aircraft and comprising an imaging path with infrared detection making it possible to locate the target and a laser path "locked" onto the imaging path. This locking assumes perfect alignment between the two paths, that is to say perfect parallelism of their optical axes thus defining the game aiming line. In fact this harmonization, carried out on a test bench in a factory, must be able to be monitored in the course of the mission.

In order to align the optical axes of a laser and of an infrared detector of an opto-electronic target designation system, U.S. Pat. No. 4,422,758 employs, as illustrated in FIG. 1, an optical device composed of mirrors 1 to 5. This device is intended to focus the laser beam FL onto refractory ceramics 6 in order to create a hot point thereon and to collimate the infrared radiation FI given off by this hot point onto the imaging path. The position of the image of the hot point on the imaging path makes it possible to measure the alignment errors of the two paths.

A first major drawback of this solution resides in the type of material used to implement it, namely refractory ceramics: this material exhibits low remanence an heats up neither easily nor quickly, which necessitates the focusing of significant energy onto the ceramics. These conditions of use render it difficult to implement due to:

—the pulse nature of the laser beam, necessitating luminosity remanence between two pulses;

—the employment, in thermal scanning cameras, of a system of deflection of the aiming line addressing the mosaic of detectors only for a very short time;

—and the duration of the alignment test, which must not exceed several seconds although the material used heats up with difficulty.

Another major drawback results from the errors in parallelism between the laser and infrared paths generated by inclination errors in the supports of the mirrors of the optical device; in order to resolve this problem, the prior art proposes a method of adjustment on the ground in three steps, particularly by making use of a telescope. Such an adjustment is fragile and cannot be preserved in the stressful conditions described.

A final drawback relates to the organization of the mirrors 1 to 5 of the optical system which confers a bulk on the assembly which is in fact incompatible with the space available.

SUMMARY OF THE INVENTION

In order to overcome these drawbacks, the invention proposes a device for monitoring of the alignment of two optical paths, laser and infrared, designed in such a way as to introduce no parallelism error and resting on the formation of a hot point by localised heating of a polyimide film arranged in a device for reliably advancing it.

More precisely, the subject of the invention is a device for monitoring of the alignment of two optical paths, a laser beam aiming path and an infrared imaging path, comprising means of conversion of the laser beam into a parallel infrared beam and means for aligning the infrared imaging path on the converted beam, characterised in that it exhibits the form of an optical housing carrying the means of conversion and in that these means of conversion are constituted by a cassette containing a polyimide film in a strip and by a set of reflecting elements.

BRIEF DESCRIPTION OF THE DRAWINGS

The invention will be better understood and other characteristics and advantages will appear on reading the description which follows with reference to the attached figures respectively representing.

DETAILED DESCRIPTION OF THE DRAWINGS

Figure 1:
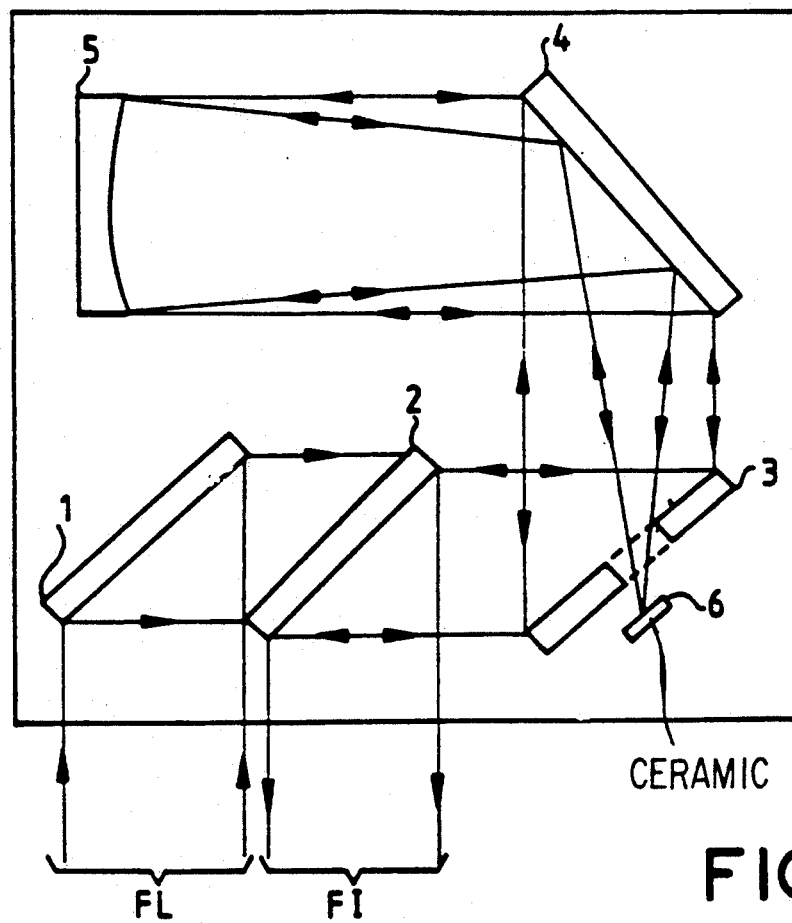
—FIG. 1, the alignment device of the prior art
Figure 2:
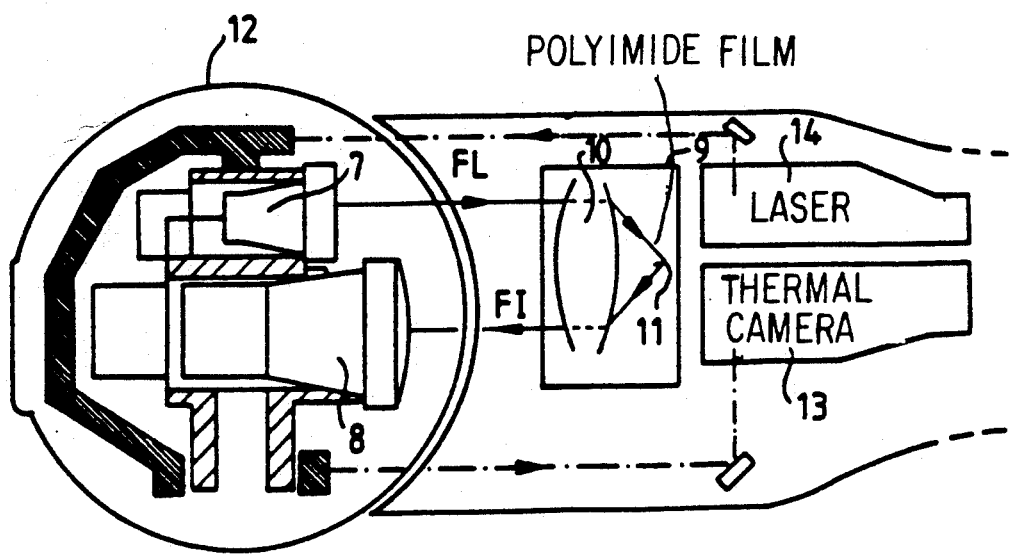
—FIG. 2, the general installation diagram of the system according to the invention.

FIG. 2 illustrates the installation diagram of the monitoring system according to the invention in a laser designation "pod": it represents a tracking head containing an optical head 12 for orientation of the aiming line, constituted by afocal devices 7 and 8, respectively for the laser path and of the infrared path, the beams FL and FI of the laser and infrared radiations, FL emerging from the afocal device 7 in order to come onto the housing for alignment monitoring 9 and FI exiting from the housing 9 in order to return parallel to FL towards the afocal device 8, the housing 9 containing an optical system 10 for focusing and for collimation and a polyimide film 11. The optical head 12 is turned round so as to face the housing 9. Thus, the optical system 10 behaves like a cube corner by converting the incident laser beam FL into an infrared beam FI which emerges, collimated, strictly parallel to the beam FL. The beam FI forms the image of the hot point on the film 11 by focusing on the detector of a thermal camera 13. The alignment error between the two paths is then measured by offset measurement, that is to say by the offset between the position of this image thus detected and its theoretical position situated, in the case of perfect parallelism in the 2 paths, at the reference point of the detector.

The housing for alignment monitoring 9 is arranged advantageously in the area where the aiming line is found during impact of the projectile on the target, that is to say behind the optical head for orientation of the aiming line 12 containing the head optics 7 and 8 and in front of the thermal camera 13 and laser 14 assembly forming an optical bench. In order to correct the harmonization defect, the orientation of the optical axis of the infrared path is modified by means of a reflecting mirror (not represented) until the measured offset is cancelled out. Such a mirror can be mounted conventionally on piezoelectric shims between the optical head 8 and the thermal camera 13.

Figure 3:
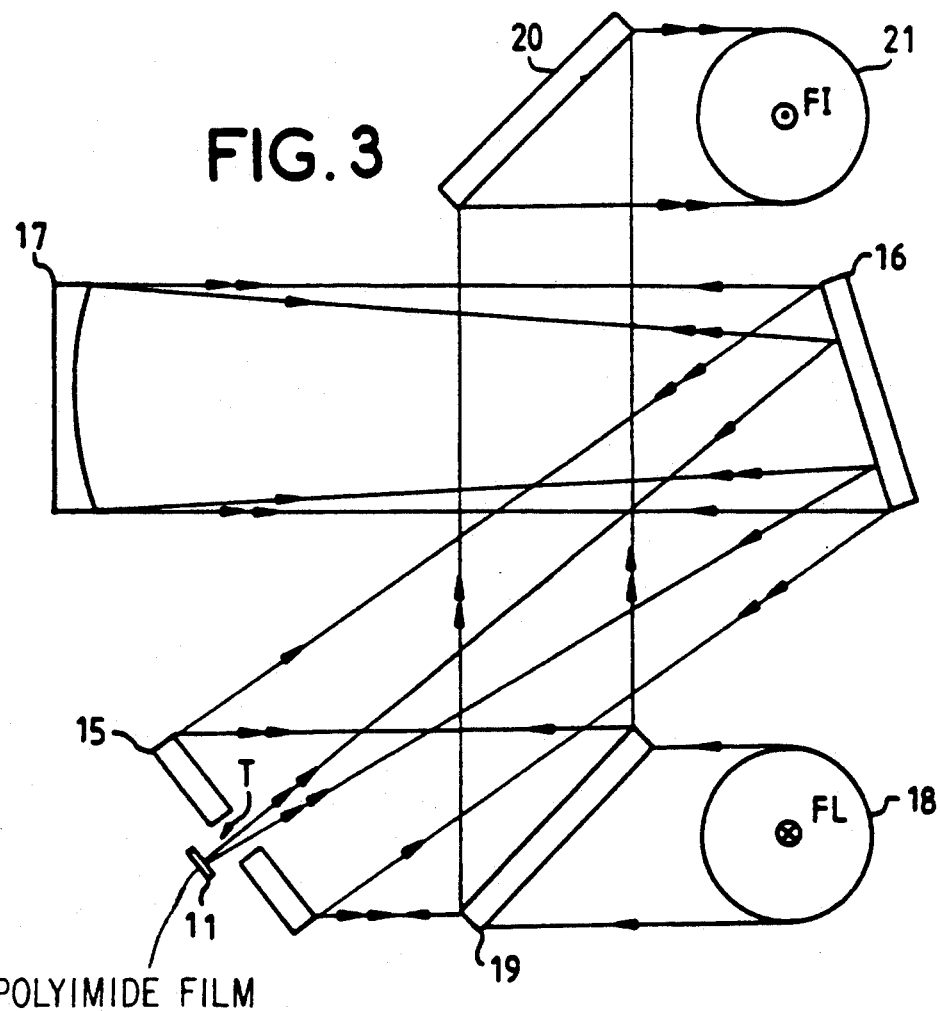
—FIG. 3, the optical route of the laser and infrared beams.

The arrangement of the various mirrors of the optical system 10, defining the optical route between the incident laser beam FL and the emerging infrared beam FI, and of the polyimide film 11 is represented in FIG. 3: the incident beam FL is first of all bent by an entry mirror 18, then traverses a dichroic mirror 19, which is transparent in the 1–2 $\mu$m band; it is next focused onto the polyimide film 11, after reflection successively at plane mirrors 15 and 16 and at a spherical focusing mirror 17 which reflects the beam onto the mirror 16 before traversing the mirror 15 by virtue of a central hole T intended to let the laser beam pass through, the film 11 being situated to the rear of the mirror 15. The heating of the polyimide film gives rise to the appearance of a hot point whose infrared radiation is collimated, in order to form the infrared beam FI transmitted by the reverse succession of mirrors 16-17-16-15; the beam FI is finally diverted towards an infrared exit mirror 21 after reflection at the dichroic mirror 19, which reflects the radiations in the 8–12 $\mu$m band, and at a mirror 20.

However, a polyimide film of whatever thickness is not usable for such an application. The thickness of the film is, in fact, a fundamental characteristic which it is advisable to adjust precisely as it controls the rapidity of appearance of the mark forming the impact of the laser on the film (also called "hot point"), the intensity of the infrared radiation emitted, the remanence and the duration of use of this mark. A film which is too fine (typically of thickness less than 5 $\mu$m) burns too quickly (after less than one second of exposure) to be able to be used; on the other hand, a film which is too thick (typically of thickness greater than 100 $\mu$m) heats up slowly and forms a mark which exhibits insufficient luminosity and remanence (less than 20 ms). A polyimide film of thickness lying between 25 and 100 $\mu$m, in particular of 50 $\mu$m, is a good choice as it fulfils the required qualities (remanence, duration of use, luminosity).

Figure 4:
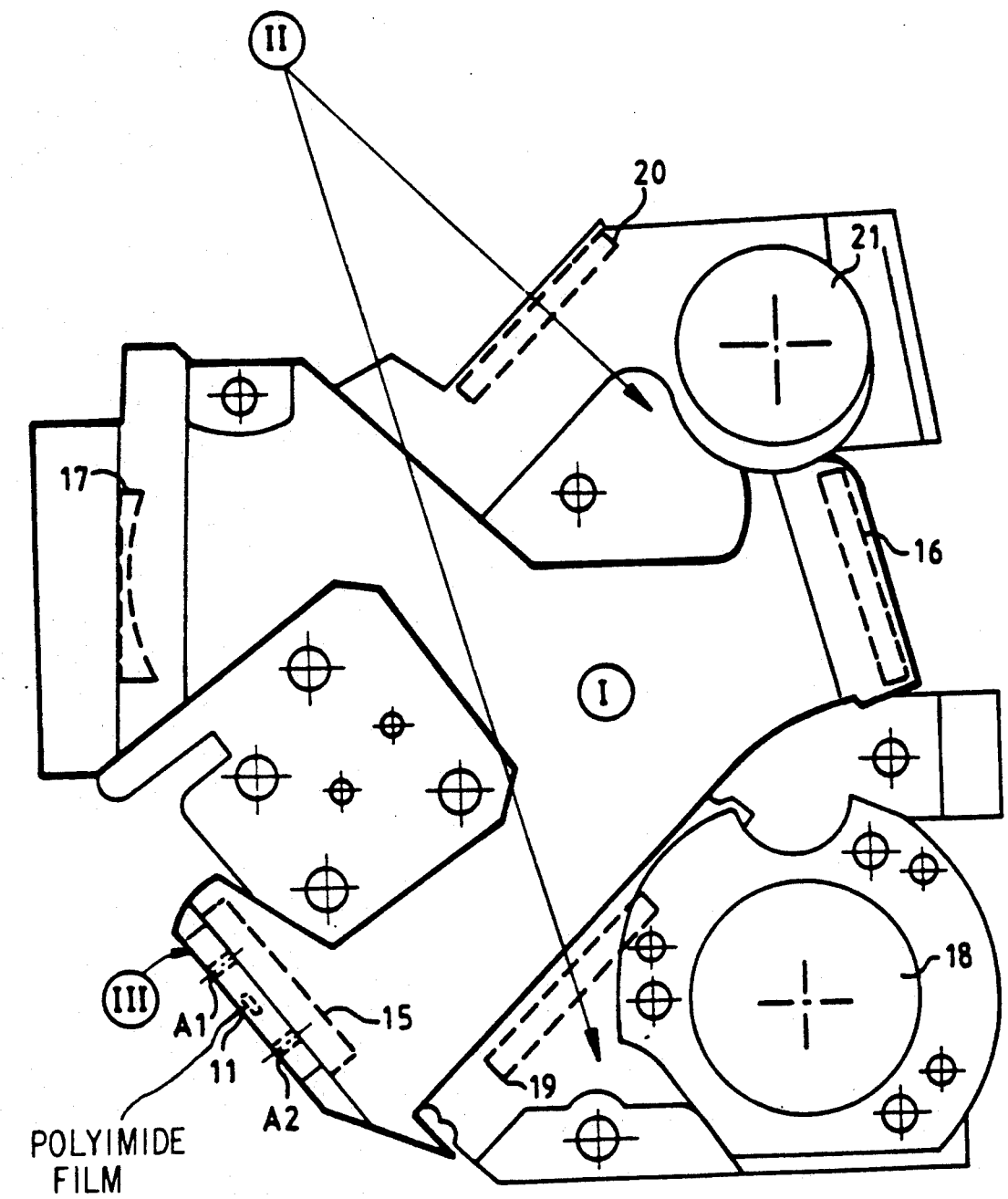
—FIG. 4, a first embodiment of the housing for alignment monitoring.

One embodiment of the housing for alignment monitoring according to the invention, in which are mounted the elements described with reference to FIG. 3, is represented diagrammatically in FIG. 4. Structurally, it exhibit the form of two half-housings I and II of complimentary shape, in such a way as to fit one inside the other, and of a cassette III containing the polyimide film. On the first half-housing I are provided fixing planes for supporting the elements (mirrors 15 to 17 and polyimide film 11) which are common to the two optical routes, namely the route of the laser beam and the route of the infrared beam (symbolised respectively in FIG. 2 by a single and a double arrow); on the second half-housing II, are provided fixing planes for supporting the optical elements (mirrors 18 to 21) which are not common to the two paths, that is to say specific either to the route of the infrared beam, or to the route of the laser beam.

In order to minimize the defects introduced by the approximate positioning of the optical elements which are not common to the two paths, two stipulations are therefore observed by virtue of the housing according to the invention:

—the number of non-common elements is minimal: in the exemplary embodiment, and taking account of the necessity for minimal bulk obtained by virtue of the bending of the entry and exit beams, it is four (a laser entry mirror 18, three infrared exit mirrors 19 to 21), —the mirrors which are not common to the two paths are mounted on the same mechanical part (half-housing II), which makes it possible to machine the fixing planes for the mirrors 19 and 20 together, on the one hand, and those for the mirrors 18 and 21, on the other hand. Great precision of alignment of these mirrors is thus obtained (of the order of 100 $\mu$rd), conferring near-perfect parallelism between the entry and exit optical paths.

The concern with precision which drives the production of the half-housing II is not required for the production of the fixing planes for the optical elements of the half-housing I: in fact, the beams FL and FI remain perfectly parallel in this part due to the fact that the intervening optical elements do no more than define one and the same geometric route for the two laser and infrared paths, only the directions of propagation of the beams FL and FI being reversed: the mirrors installed on the fixing planes of this half-housing I form a single optical system for focusing or for collimation according to the direction of the optical route followed.

The cassette III containing the polyimide film is integrated into the half-housing I, containing the optical elements which are common to the two paths. The polyimide film chosen, whose thickness (lying between 25 and 100 $\mu$m) has been determined on the basis of optical characteristics, cannot be used more than once in the conditions of use employed (that is to say with a laser whose power is greater than a few MW). This obstacle is surmounted just by installing such a cassette having two spindles A1 and A2 onto which the polyimide film is wound which, with the thickness lying between 25 and 75 $\mu$m, is sufficiently flexible. Between two alignment tests, the strip is advanced by a few millimeters.

However, a specific adaptation has to be optimized in order to render such a material usable in severe conditions of use (in particular in a vibrating environment).

Figure 5:
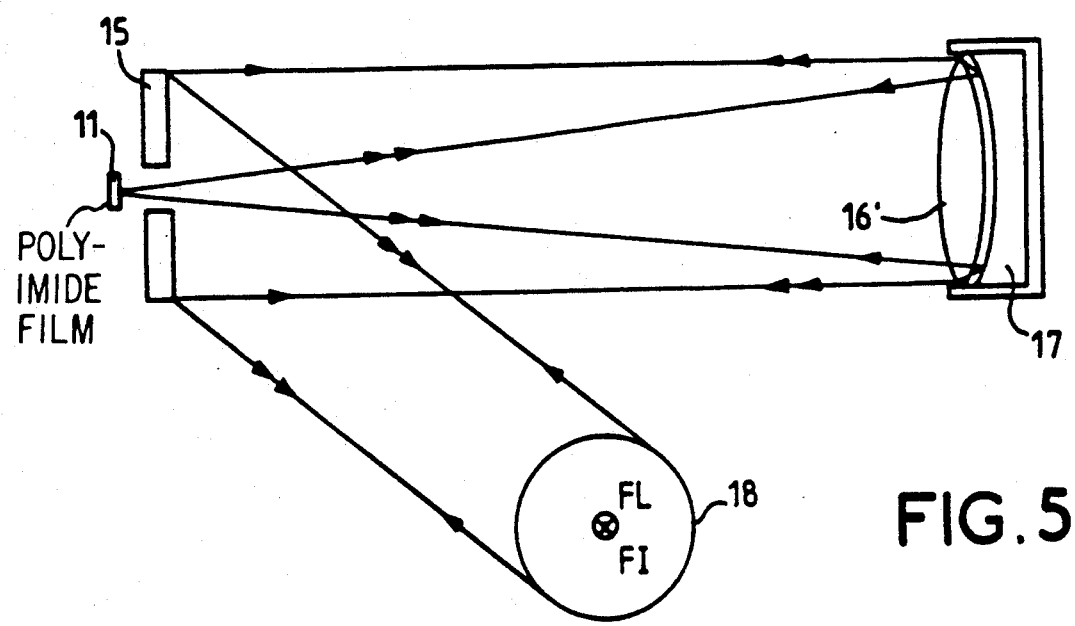
—FIG. 5, a second embodiment of the housing for alignment monitoring.

With this aim, it is highly appropriate to attach the winding spindles solidly to the frame of the pod carrying the monitoring housing 9 and to fix in place an anti-return ratchet acting on the polyimide strip, so as to preserve sufficient and constant tension in the film. Moreover, the association of one of the winding spindles with a position-recopy optical coupler makes it possible to check that the film advances correctly; it is then necessary to suppress the play on the recopy spindle by virtue of a slight overpressure, formed during installation of the cassette;

In a variant, the alignment device according to the invention may equip, in a simplified version, a laser designation system with a common final optical path, the optical head for deflection of the aiming line being common to the laser (1 to 2 $\mu$m) and infrared (in the 3–5 $\mu$m or 8–12 $\mu$m wavelength band) paths which are subsequently separated by virtue of an optical separator, for example a dichroic mirror. In these conditions, the alignment housing is composed principally, as illustrated in FIG. 5, by the entry mirror 18, by the holed mirror 15 and by the spherical mirror 17 associated with a converging lens 16', the exit mirrors 19 to 21 no longer being necessary. The converted beam FI emerges coaxially to the incident laser beam FL via the mirror 18 which serves as entry/exit mirror.

The invention is not limited to the embodiments described and represented, in particular:

— the material used for the spherical mirror can be in aluminium as can the structure of the support housing so as to avoid any thermal defocusing, — the person skilled in the art may employ a fine adjustment of the alignment of the two paths, after machining of the housing, with the aid of diasporametric prisms placed on the laser path (in particular in front of the entry mirror), — when the laser beam focuses too precisely on the polyimide film, a phenomenon of "breakdown" is produced, due to the ionisation of the surrounding air and no mark appears; it can then be arranged to slightly defocus the laser beam on the optical axis (from 1 to 3 mm) by virtue of a long focal length lens placed at the entry of the laser path.

We claim:

1. A system for monitoring an alignment of two optical paths including a laser beam aiming path and an infrared imaging path, comprising:
   means for converting the laser beam into an infrared beam parallel to the laser beam;
   means for aligning the infrared imaging path on the converted infrared beam;
   an optical housing containing the means for converting and including:
   a cassette containing a polyimide film in a strip associated with an optical assembly for focusing the laser beam and the collimation of the converted infrared beam.

2. A system according to claim 1, wherein:
   the optical assembly includes a sub-assembly of reflecting elements common to the two optical paths and a sub-assembly of reflecting elements specific to one of said two optical paths;
   the optical housing is formed by two half-housings, a first half-housing including reflecting elements which are common to the two optical paths and a second half-housing including reflecting elements which are specific to one or to the other of the two optical paths
   wherein the second half-housing includes an optical system with parallel entry/exit paths including an entry mirror for bending an incident laser beam and three exit mirrors for bending an emergent infrared beam, and for focusing the laser beam FL onto the polyimide film and for collimating the infrared beam FI emitted by the polyimide film.

3. A system according to claim 1, wherein the said optical assembly comprises an entry mirror for an incident laser beam FL and three mirrors (15, 16', 17) for focusing the beam FL onto the polyimide film and for collimating a beam FI emitted by the polyimide film, the beam Fi emerging at an exit coaxially to the incident beam FL via said entry mirror.

4. A system according to claim 1, wherein:
   the polyimide film has a thickness between 25 and 75 μm and is wound in the form of a strip in the cassette integrated into a half-housing for alignment monitoring and equipped with means for advancing the film.

5. A system according to claim 4, wherein the cassette comprises:
   two spindles ($A_1$) and ($A_2$) for winding the polyimide film, the spindles being firmly attached to a frame of a "pod",
   an anti-return ratchet for ensuring sufficient tension in the polyimide strip and
   a position-recopy optical coupler for monitoring advancing of the film.

6. A system according to claim 2 wherein the housing and at least one of the reflecting elements of the first half-housing are made of aluminum.

7. A system according to claims 2 or 3, wherein the parallelism in the incident and emergent beams FL and FI is refined using diasporametric prisms placed on a path of the laser beam.

8. A system according to claim 2 further comprising:
   a means for defocusing the laser beam by 1 to 3 mm with respect to a focal length of one of the reflecting elements of the first half-housing.

9. A system according to claim 3, wherein the housing and one of the three mirrors for focusing the beam FL onto the polyimide film are made of aluminum.

10. A system according to claim 3, further comprising:
    means for defocusing the laser beam by 1 to 3 mm with respect to a focal length of one of the three mirrors for focusing the beam FL onto the polyimide film.

11. A target designation system using laser guidance, comprising:
    an optical head for orientation of an aiming line including at least one a focal device for a laser path and an infrared path and an optical bench including:
    a thermal camera;
    a laser source
    an alignment monitoring device of two optical paths including a laser beam aiming path and an infrared imaging path, comprising:
    means for converting the laser beam into an infrared beam parallel to the laser beam;
    means for aligning the infrared imaging path on the converted infrared beam resulting from the conversion;
    an optical housing containing the means for converting and including:
    a cassette containing a polyimide film in a strip associated with an optical assembly for focusing the laser beam and the collimation of the infrared beam resulting from conversion by the means for converting;
    wherein said alignment monitoring device is arranged between the optical head and the optical bench in such a way so as to convert a laser beam FL, originating from the afocal device, into an infrared beam FI with an axis rigorously parallel or coincident with that of the laser beam FL and transmitted to the afocal device when the optical head is rotated.

* * * * *